(12) United States Patent
Khurange et al.

(10) Patent No.: US 10,049,016 B2
(45) Date of Patent: Aug. 14, 2018

(54) DISTRIBUTED GARBAGE COLLECTION FOR THE DEDUPE STORAGE NETWORK

(71) Applicants: Ashish Govind Khurange, Pune (IN); Sachin Baban Durge, Pune (IN); Kulangara Kuriakose George, Pune (IN); Kuldeep Sureshrao Nagarkar, Pune (IN); Ravender Goyal, Saratoga, CA (US)

(72) Inventors: Ashish Govind Khurange, Pune (IN); Sachin Baban Durge, Pune (IN); Kulangara Kuriakose George, Pune (IN); Kuldeep Sureshrao Nagarkar, Pune (IN); Ravender Goyal, Saratoga, CA (US)

( * ) Notice: Subject to any disclaimer, the term of this patent is extended or adjusted under 35 U.S.C. 154(b) by 289 days.

(21) Appl. No.: 14/818,260

(22) Filed: Aug. 4, 2015

(65) Prior Publication Data

US 2016/0232059 A1 Aug. 11, 2016

Related U.S. Application Data

(63) Continuation-in-part of application No. 14/701,530, filed on May 1, 2015, which is a continuation-in-part of application No. 14/615,434, filed on Feb. 6, 2015.

(51) Int. Cl.
*G06F 11/14* (2006.01)
*G06F 12/02* (2006.01)
*G06F 17/30* (2006.01)

(52) U.S. Cl.
CPC ...... *G06F 11/1448* (2013.01); *G06F 12/0253* (2013.01); *G06F 12/0261* (2013.01); *G06F 12/0269* (2013.01); *G06F 17/30159* (2013.01); *G06F 17/30212* (2013.01); *G06F 11/1453* (2013.01); *G06F 2201/825* (2013.01)

(58) Field of Classification Search
CPC ............ G06F 12/0253; G06F 12/0261; G06F 12/0269; G06F 11/1453
See application file for complete search history.

(56) References Cited

U.S. PATENT DOCUMENTS

| 5,202,982 A * | 4/1993 | Gramlich .......... G06F 17/30171 |
| 2012/0117029 A1* | 5/2012 | Gold .................. G06F 11/1451 707/651 |
| 2013/0091102 A1* | 4/2013 | Nayak .................. G06F 3/0613 707/692 |
| 2014/0149794 A1* | 5/2014 | Shetty ................. H04L 67/1095 714/20 |

(Continued)

*Primary Examiner* — William Spieler

(57) ABSTRACT

In the dedupe storage network priority to data replication needs to be given over the garbage collection (GC) activity. For this purpose GC running on any site should not impose any locking on its peer sites for replication. For replication activity GC activity must be completely transparent. In the dedupe storage network, the retention policy of a replicated image is controlled by the site where the image was originated. Distributed GC running on the originating site can only inform the replication sites the list of expired replicated images and cleanup of replicated garbage chunks from its remote FS database for corresponding replication sites. But it cannot cleanup garbage chunks from replication sites. Garbage chunks can only be cleaned by the local GC running on that site.

3 Claims, 6 Drawing Sheets

(56) References Cited

U.S. PATENT DOCUMENTS

2016/0077926 A1* 3/2016 Mutalik .............. G06F 11/1456
 711/162
2016/0188668 A1* 6/2016 Sharangpani ..... G06F 17/30153
 707/718

* cited by examiner

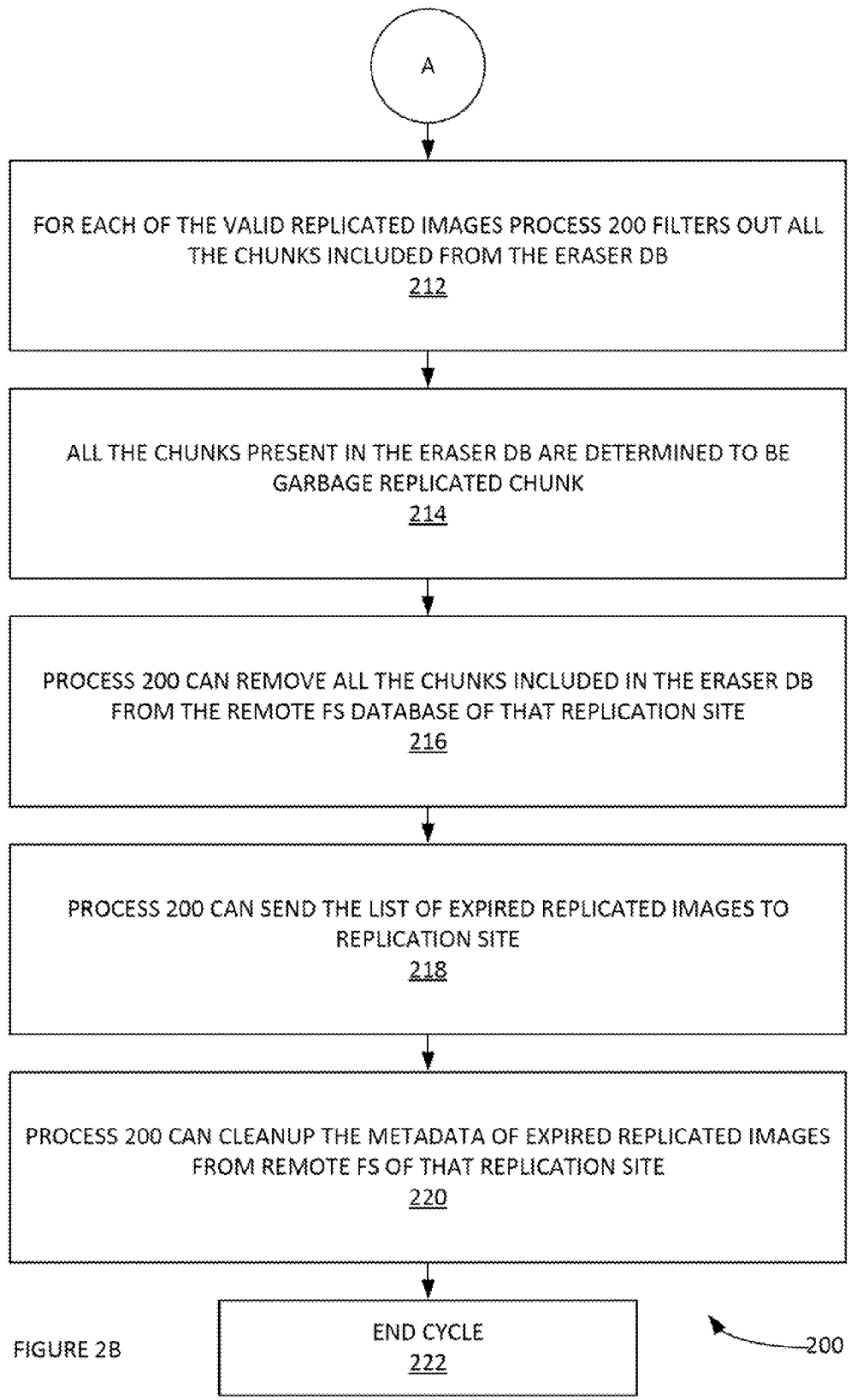

DISTRIBUTED GARBAGE COLLECTION FOR THE DEDUPE STORAGE NETWORK

CROSS-REFERENCE TO RELATED APPLICATIONS

This application claims priority to U.S. patent application Ser. No. 14/701,530, titled METHODS AND SYSTEMS OF A DEDUPE STORAGE NETWORK FOR IMAGE MANAGEMENT filed on 1 May 2015. This application is incorporated herein by reference. This application claims priority to U.S. patent application Ser. No. 14/615,434, titled METHODS AND SYSTEMS OF A DEDUPE FILE-SYSTEM GARBAGE COLLECTION filed on 6 Feb. 2015. This application is incorporated herein by reference.

BACKGROUND

1. Field

This application relates generally to data storage, and more specifically to a system, article of manufacture and method of methods and systems of a distributed garbage collection for the dedupe storage network.

2. Related Art

It is noted that conflicts can arise when a garbage collection (GC) operation is running on a site while other sites in the dedupe storage network concurrently begins uploading data to said site. A conflict can also arise when the onsite starts downloading data from another site. For example, the GC is in 'data gathering' state and a replication site is already uploading data. The replication site may not be able complete the data upload before GC changes its state to 'data deletion'. In another example, GC can be in a 'data gathering' state and the onsite is already downloading data. Accordingly, it may not be able to complete the download before GC changes its state to 'data deletion'. In a 'data gathering' state, GC can list all the unique chunks from dedupe file system in Eraser DB, considering all of them as potential garbage chunks. Then the GC can iterate over all the valid backup images and filter out their data chunks from Eraser DB. This is how GC finds out list of garbage and orphan chunks from dedupe file system. In this case the ongoing uploads and downloads have created new data chunks but not the metadata for that dedupe image. Accordingly, the GC is in a 'data gathering' state and considers these partial uploaded or downloaded chunks as orphan chunks and deletes them from the system. To overcome this problem we changed the upload and download process.

It is further noted that when a GC operation is running on a site and at the same time if other sites present in the dedupe storage network starts uploading data to that site or if onsite starts downloading data from another site various conflicts can arise. For example, a replication site uploaded dedupe file system specific metadata after GC prepared its garbage chunk list in Eraser database (DB). In this case if the replication site wants to upload a chunk which is also included in Eraser DB, then whether the upload happens first or chunk deletion by GC happens first can result into backup image corruption. Onsite downloaded dedupe file system specific metadata after GC prepared its garbage chunk list in Eraser DB. In this case onsite never downloads the chunk which is present locally in dedupe file system. The data download process relies on the locally available copy of data chunk for dedupe image creation. If the download process relying on a data chunk which is also part of Eraser DB, then garbage chunk deletion by GC will eventually make the downloaded image corrupt. Both these problems occur because GC state machine is transparent to upload and download processes. When GC in 'data deletion' state, backup process gives new life to data chunks by adding hardlink to the chunks. But since replication process is not aware of GC state machine it cannot give new life to garbage chunks.

BRIEF SUMMARY OF THE INVENTION

In one embodiment, a computer-implemented method of handling garbage data chunks in a replication operation of a dedupe file system comprising the step of determining when the garbage collection operation is initiated. The method includes the step of recording the initiation time of the garbage collection. When the garbage collection operation is in a data deletion state, for each garbage data chunk, the method implements the following steps: acquiring, with the garbage collection operation, a write lock for the data chunk; determining that a hardlink count of data chunk; if the hardlink count is one (1), marking the data chunk as garbage data chunk; and moving, with the garbage collection operation, the garbage data chunk to a temporary trash directory. The method includes the step of deleting, with the garbage collection operation, the dedupe file system specific metadata of backup images, which are expired. The method includes the step of listing, with the garbage collection operation, one or more new backup images created as a result of a replication operation after the initiation time of garbage collection operation. For each such new backup image, the method reclaims the garbage collection operation, one or more data chunks included in a backup image that is a part of the temporary trash directory, and wherein the garbage collection operation recovers the one or more backup data chunks to the dedupe file system. The method includes the step of deleting, with the garbage collection operation, all the remaining data chunks present in the temporary trash directory.

In another aspect, a computer-implemented method of a dedupe file system includes the step of replicating a dedupe file system specific metadata of a backup image. The method includes the step of replicating one or more data chunks of the backup image. The method includes the step of replicating the backup application specific metadata. The method includes the step of advertising to the backup application that the backup image is read ready.

Figure 1:
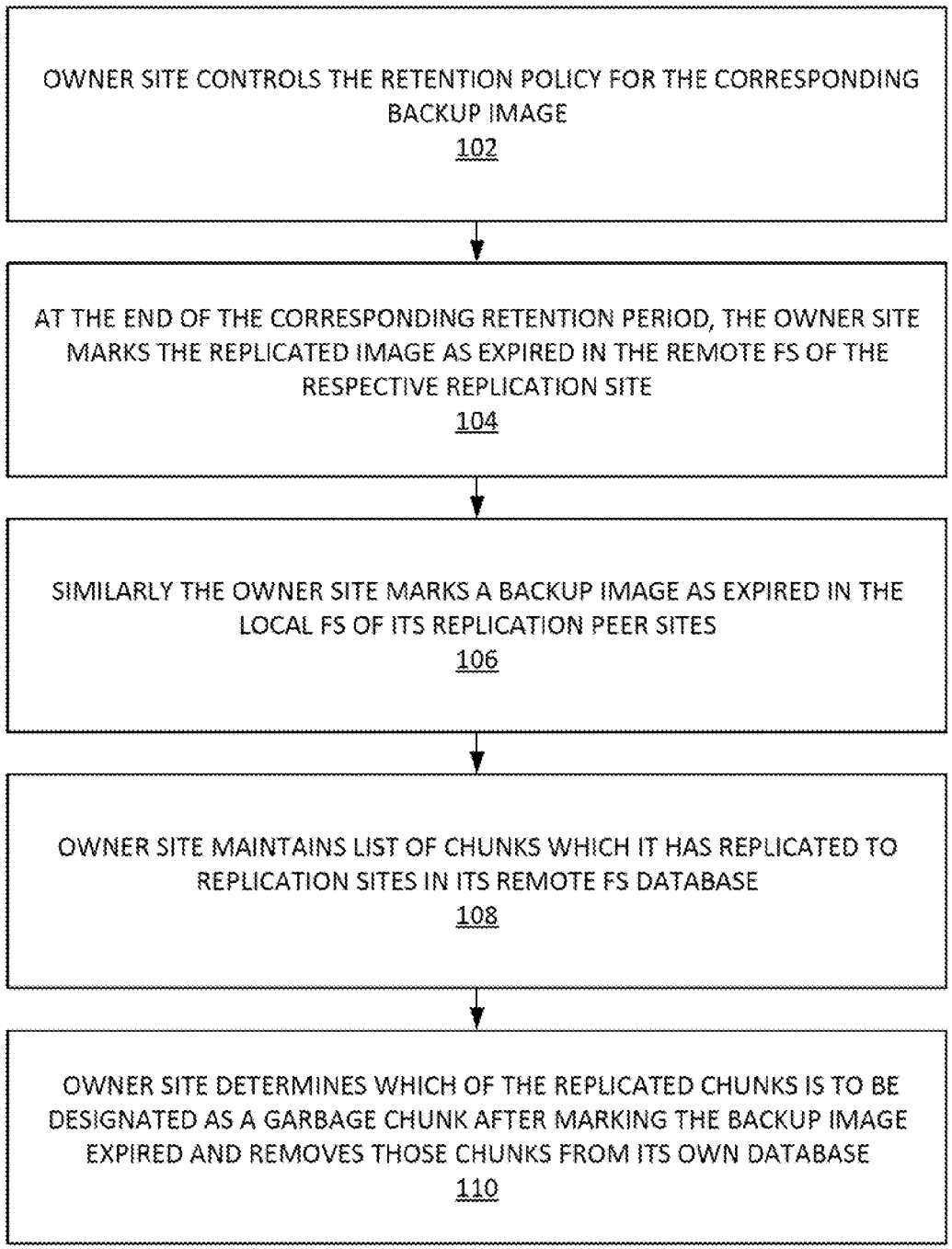
FIG. 1 illustrates an example process of determining which of the replicated chunks is to be designated as a garbage chunk after marking the backup image expired, according to some embodiments.

The Figures described above are a representative set, and are not an exhaustive with respect to embodying the invention.

DESCRIPTION

Disclosed are a system, method, and article of manufacture of methods and systems of a distributed garbage collection for the dedupe storage network. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application server can be, inter alia, a software framework that provides a generalized approach to creating an application-server implementation, regard to what the application functions are and/or the server portion of a specific implementation instance. The server's function can be dedicated to the execution of procedures (e.g. programs, routines, scripts) for supporting its applied applications. An application server can be an example of a physical server.

Associated owner site can be a site at which this backup image was originally created A backup, or the process of backing up, can refer to the copying and/or archiving of computer data so it may be used to restore the original after a data loss event.

Backup window period of time when backups are permitted to run on a system.

Backup image (or image) can include copies of programs, system settings, files, etc. It can be a complete system backup that can be used for restore operations.

Chunk (also a 'data chunk') can be the segments of data that are generated from a data stream by splitting the data stream at fixed or variable lengths. A chunk can be a specified fixed size or variable size.

Cloud computing can be computing that can involve a large number of computers connected through a communication network such as the Internet. Cloud computing can be a form of distributed computing over a network, and can include the ability to run a program or application on many connected computers at the same time.

Cloud storage can be a model of networked enterprise storage where data is stored in virtualized pools of storage which are generally hosted by third parties. Hosting companies can operate large data centers, and users can have data hosted by leasing storage capacity from said hosting companies. Physically, the resource can span across multiple servers and multiple locations.

Onsite can mean that a dedupe storage node which initiates the replication upload/download.

Replication site can be the dedupe storage node where data is pushed or fetched from. Replication can mean the uploading of the dedupe image to the replication partner.

Dedupe storage network is represented in the form of a graph topology, where node represents dedupe storage node, and the directed edge represent the data replication path. In dedupe storage network data is replicated in dedupe preserving manner. A data chunk which is present at a dedupe storage node is never replicated to that same storage node by any other storage node in the dedupe storage network.

Local fs, represents the dedupe data present locally on any dedupe storage node. It comprises of all the unique data chunks, the metadata representing dedupe images and the database which lists the unique data chunks present locally.

Remote fs, represents the dedupe data which has been replicated to a replication site by a dedupe storage node in the dedupe storage network. It comprises of the metadata representing the replicated dedupe images and the database which lists the unique data chunks replicated to replication site.

Exemplary Methods

Garbage collection (GC) design for a standalone site can operate on a state machine. Accordingly, GC can be optimized to make minimum possible impact on a backup window. With a dedupe storage network, for dedupe file system on any site apart from local backups, there can be many writers, in the form of many sites. These writers can be replicating their backup images. In this example, GC activity may be of relatively of less priority than other operations such as: dedupe data read, write, upload and download. GC's state machine may not impose any locking for data upload and download from and to, to any other sites in the dedupe storage network. The state of GC of any site can be completely transparent to all its peers performing data upload and download. GC can honor the data inflow in the form of uploads or downloads happening in the dedupe storage network and get rid of only garbage chunks from the dedupe file system. Accordingly, systems and methods are provided herein that can provide a distributed garbage collection for the dedupe storage network.

Processes 100 and 200 provide various methods for implementing Principle of distributed GC. FIG. 1 illustrates an example process 100 of determining which of the replicated chunks is to be designated as a garbage chunk after marking the backup image expired, according to some embodiments. In some embodiments, in the dedupe storage network each backup image can have an associated owner site. In step 102 of process 100, the owner site can controls the retention policy for the corresponding backup image. The owner site can expire the backup image from its local file system (fs) after the local retention period is over by marking it as expired. When the owner site marks backup image as expired in its local fs, the garbage collector (GC) running on the owner site can clean up the garbage chunks related to this expired image. Similarly the owner site can also maintain a list of all other sites in the dedupe storage network. In the dedupe storage network, a backup image can be replicated during its respective retention period. In step 104, at the end of the corresponding retention period, the owner site marks the replicated image as expired in its own remote fs for the respective replication site.

Similarly, in step 106, the owner site can mark a backup image as expired in the local fs of its replication peer sites. In step 108, the owner site can maintain list of chunks which it has replicated to replication sites in its remote fs database. However, this database can be a subset of chunks present at the replications site. At the replication sites, there can be many more chunks present as a result of backups happening at that site and replications happening from other sites. Accordingly, in some examples, the owner site may not be able decide which chunks are garbage chunks at the replication site. In this case, the owner site may not be able to cleanup any chunks at replication site. However, the owner site can correct its own database of replicated chunks. In step 110, the owner site can determine which of the replicated chunks is to be designated as a garbage chunk after marking the backup image expired and removes those chunks from its own remote fs database. Accordingly, the GC running on the replication sites has full knowledge of chunks present at that site and can clean up the garbage chunks.

Figure 2A:
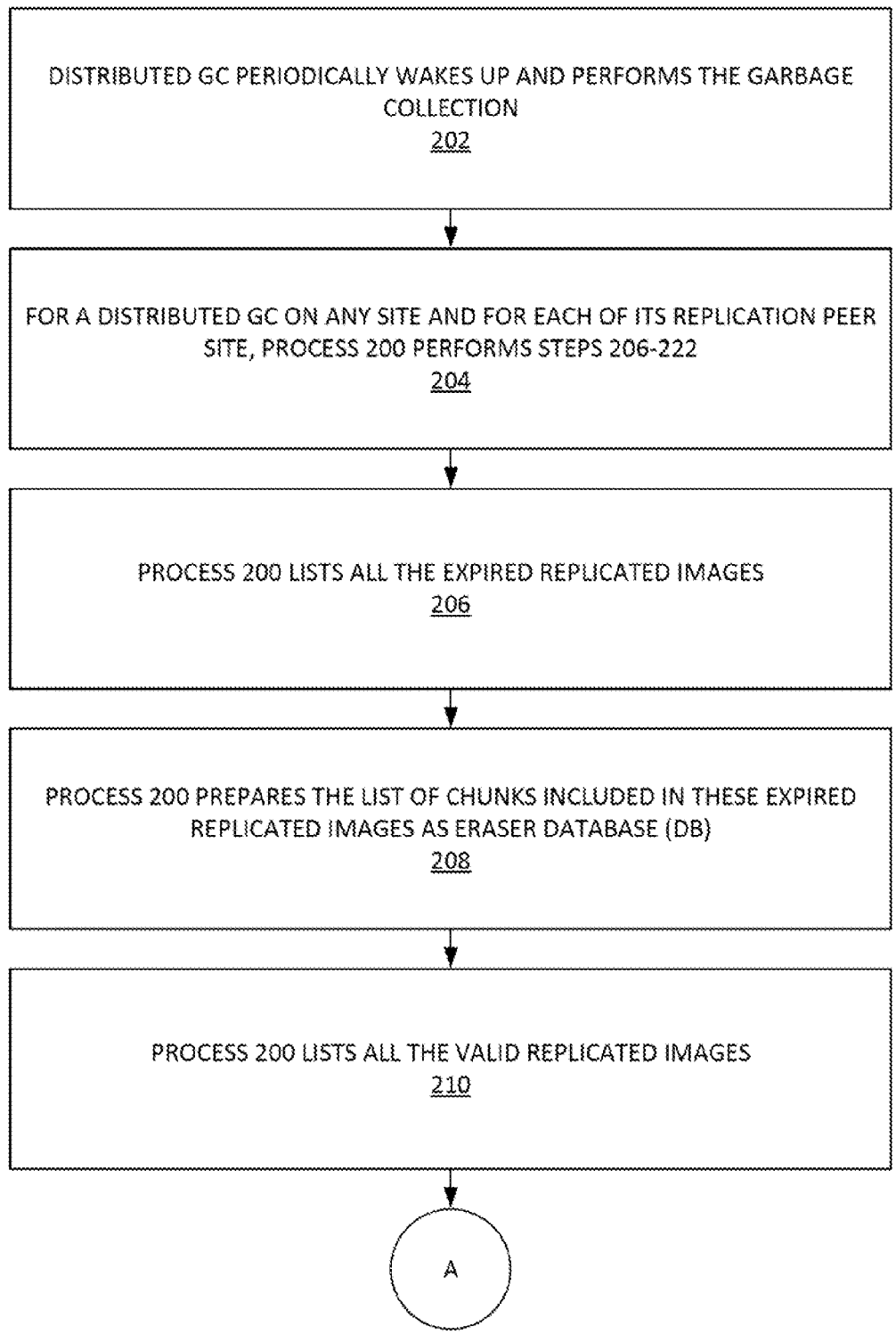
FIGS. 2 A-B illustrates an example distributed GC process that implements a dedupe storage network, according to some embodiments.

FIGS. 2 A-B illustrate an example distributed GC process 200 that implements a dedupe storage network, according to some embodiments. In step 202 of process 200, the distributed GC periodically wakes up and performs the garbage collection. In step 204, for a distributed GC on any site and for each of its replication peer site, process 200 performs steps 206-222. In step 206, process 200 lists all the expired replicated images. In step 208, process 200 prepares the list of chunks included in these expired replicated images as Eraser database (DB). It is noted that all the chunks included in all expired replicated images are considered as garbage chunks initially. In step 210, process 200 lists all the valid replicated images. For each of the valid replicated images, in step 212, process 200 filters out all the chunks included from the Eraser DB. In step 214, at the end of step 212, all the chunks present in the Eraser DB are determined to be garbage replicated chunks.

In step 216, process 200 can remove all the chunks included in the Eraser DB from the remote fs database for that replication site. This way the purification of local view of replication site's chunks list is done. In step 218, process 200 can send the list of expired replicated images to replication site. The replication site in turn can mark these images as expired in its local fs. Process 200 can leave the actual chunk garbage collection task to the local GC running on that replication site. In step 220, process 200 can clean up the metadata of expired replicated images from remote fs for that replication site. In step 222, process 200 can then go to sleep as the cycle complete.

Figure 3:
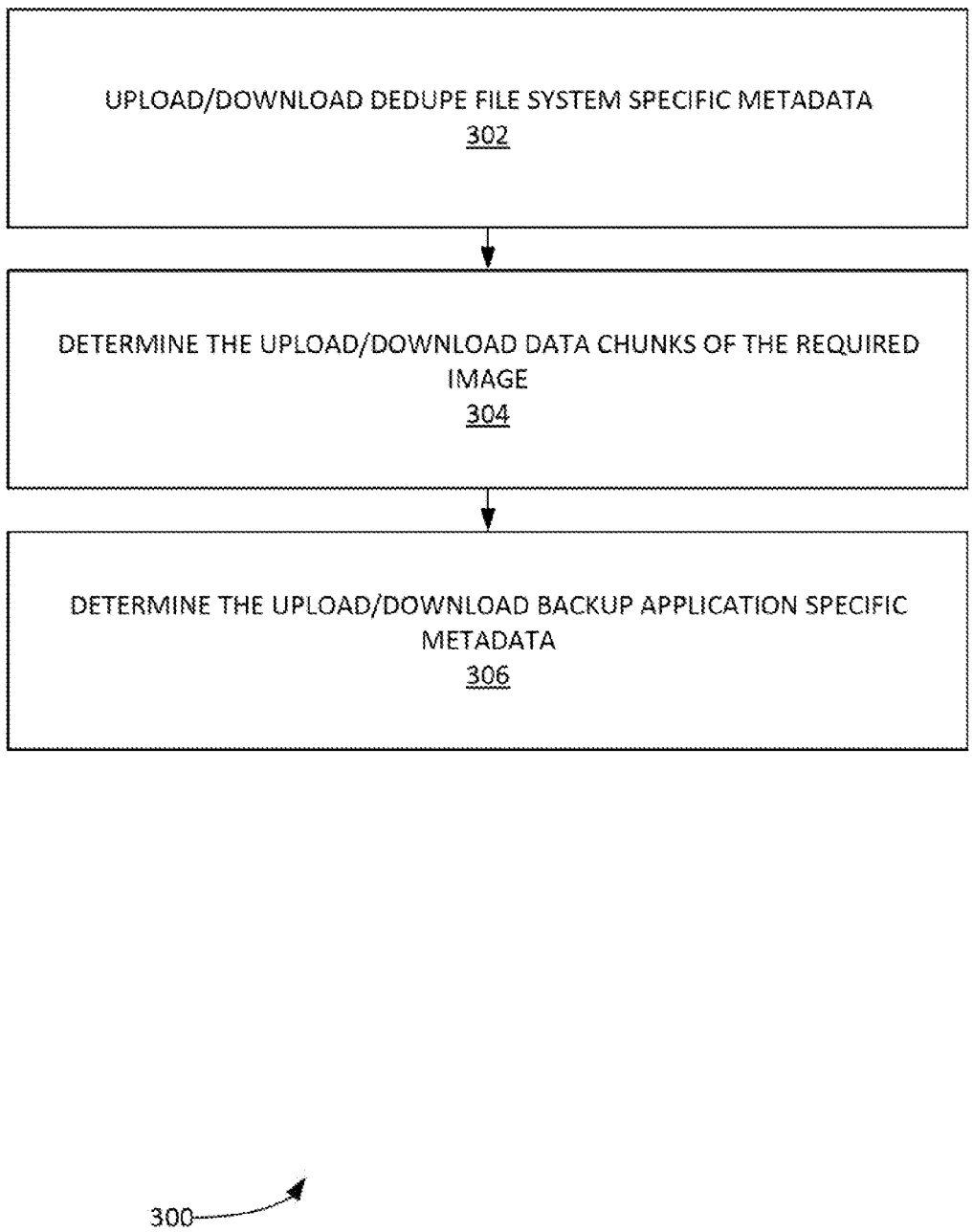
FIG. 3 illustrates an example process of dealing with an orphan chunk issue in upload and downloads.

FIG. 3 illustrates an example process 300 of dealing with an orphan chunk issue in upload and downloads. It is noted that the metadata of backup image is split into two categories: dedupe file system specific and backup application specific. An example upload and download process is now provided. In step 302, process 300 uploads/downloads dedupe file system specific metadata. It is noted that uploads/downloads dedupe file system specific metadata can be a form of a replication operation. Though the corresponding data is not yet present in the dedupe file system, dedupe file system considers this as valid image. The user of this file system is backup application and since backup application specific metadata is not yet present, the application will never request the read for this image in transient phase. In step 304, process 300 determines the upload/download data chunks of the required image. In step 306, process 300 determines the upload/download backup application specific metadata. After this point it is advertised to the backup application that this image is read ready.

Figure 4:
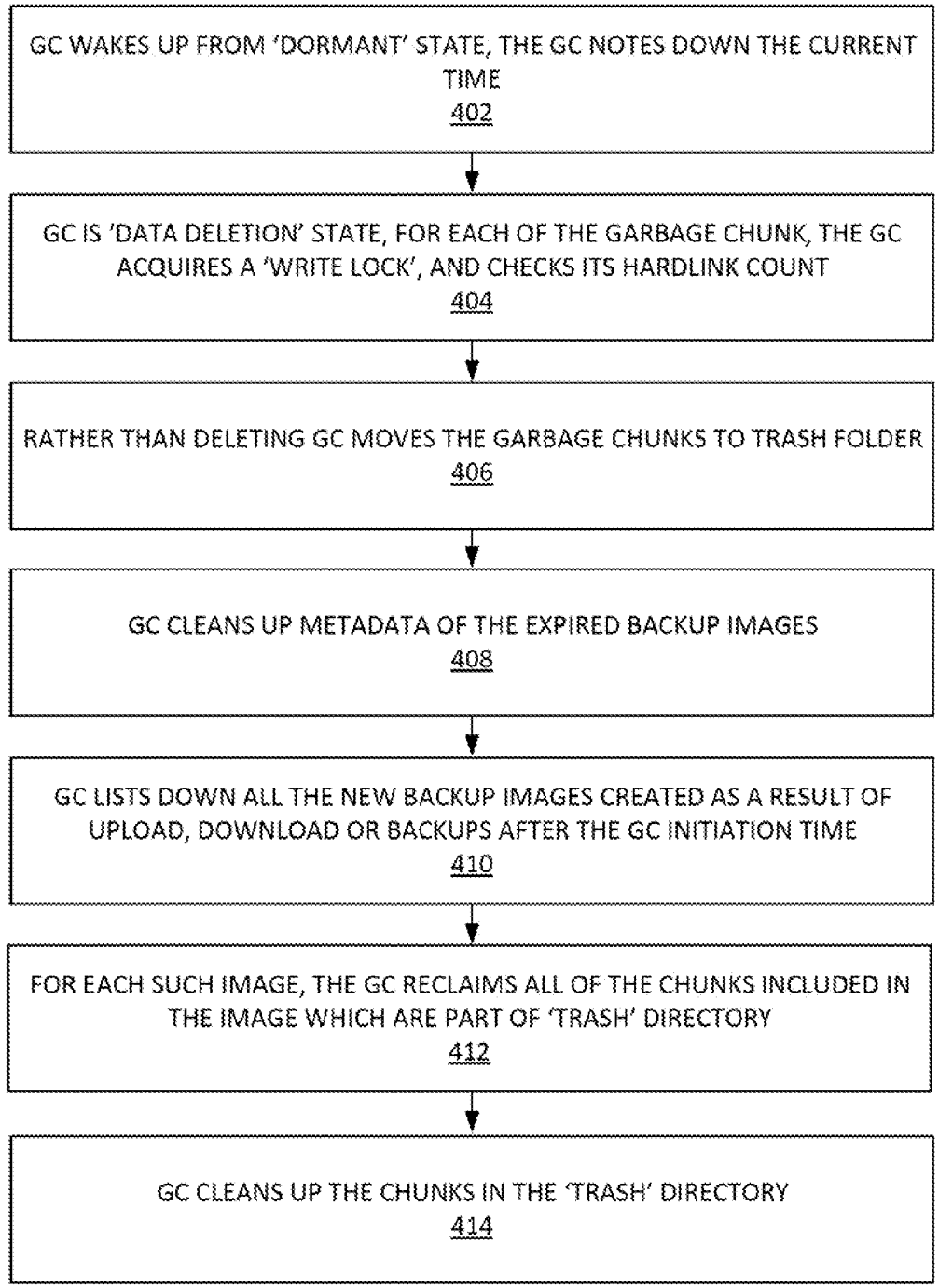
FIG. 4 illustrates an example process of implementing a solution to the garbage chunk issue in upload and download operations, according to some embodiments.

FIG. 4 illustrates an example process 400 of implementing a solution to the garbage chunk issue in upload and download operations, according to some embodiments. In step 402, when a GC wakes up from 'dormant' state, the GC notes down the current time (e.g. as 'T1'), as the initiation time of the garbage collection. In step 404, when GC is in 'data deletion' state, for each of the garbage chunk, the GC acquires a 'write lock', and checks its hardlink count. If it is one (1) then an earlier GC was used to directly delete that chunk. Now rather than deleting the chunk, the GC moves such chunks to temporary 'trash' directory. In step 406, rather than deleting GC can move the garbage chunks to trash folder. In step 408, the GC cleans up metadata of the expired backup images. In step 410, GC cleans up the chunks in the 'trash' directory. If chunk is present in the 'trash' directory, that means GC has cleaned up that chunk because it was garbage. GC recovers such required backup chunks to the dedupe file system. In step 412, for each such image, the GC reclaims all of the chunks included in the image which are part of 'trash' directory. In step 414, the GC cleans up the chunks in the 'trash' directory.

Exemplary Systems

In the dedupe storage network priority to data replication needs to be given over the garbage collection activity. For this purpose GC running on any site should not impose any locking for its replication peer sites. For replication activity GC state machine must be completely transparent.

Distributed GC can only inform the replication sites the list of expired replicated images and cleanup of replicated garbage chunks from its remote fs database for corresponding replication sites. But it cannot cleanup garbage chunks from replication sites. Garbage chunks can only be cleaned by the GC running on that site.

If data is replicated first and then metadata for an image, then GC can clean up the data chunks of images whose replication is in progress considering them as orphan chunks. This is solved by changing the data replication process as: replicate dedupe file system specific metadata first, then data, followed by backup application specific metadata.

In case replication starts after GC has prepared garbage chunk list in Eraser DB, and if there is common chunk between image getting replicated and garbage chunk. Then GC activity can corrupt the image getting replicated. This is solved by GC not directly cleaning up garbage chunks, but moving them to "trash" folder. Later checking all the images created after GC started operation from "dormant" state. For each such image if a data chunk included in it is present in "trash" directory, GC must restore it back to dedupe file system. After this exercise whatever remains inside "trash" folder are truly garbage chunks and GC gets rid of them from the system.

Figure 5:
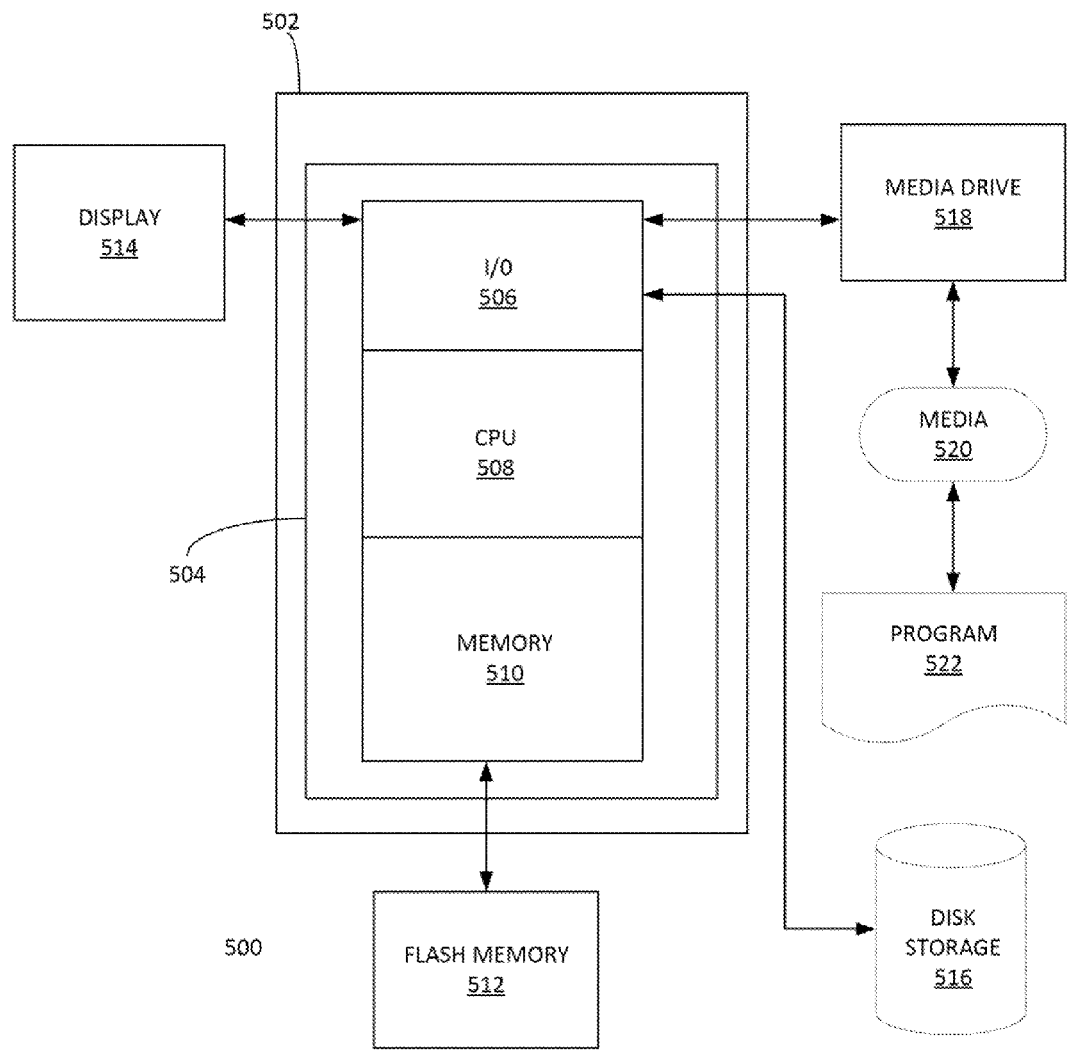
FIG. 5 depicts an exemplary computing system that can be configured to perform any one of the processes provided herein.

FIG. 5 depicts an exemplary computing system 500 that can be configured to perform any one of the processes provided herein. In this context, computing system 500 may include, for example, a processor, memory, storage, and I/O devices (e.g., monitor, keyboard, disk drive, Internet connection, etc.). However, computing system 500 may include circuitry or other specialized hardware for carrying out some or all aspects of the processes. In some operational settings, computing system 500 may be configured as a system that includes one or more units, each of which is configured to carry out some aspects of the processes either in software, hardware, or some combination thereof.

FIG. 5 depicts computing system 500 with a number of components that may be used to perform any of the processes described herein. The main system 502 includes a motherboard 504 having an I/O section 506, one or more central processing units (CPU) 508, and a memory section 510, which may have a flash memory card 512 related to it. The I/O section 506 can be connected to a display 514, a keyboard and/or other user input (not shown), a disk storage unit 516, and a media drive unit 518. The media drive unit 518 can read/write a computer-readable medium 520, which can contain programs 522 and/or data. Computing system 500 can include a web browser. Moreover, it is noted that computing system 500 can be configured to include additional systems in order to fulfill various functionalities. Computing system 500 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic dedupe area communication protocol, etc.

It is noted, after the system is recovered on the cloud by the cloud appliance, the cloud-appliance can be configured to regularly backup the recovered system running on the cloud. Accordingly, multiple images corresponding to the system running on the cloud can be captured and stored by the cloud appliance. The cloud-appliance can detect the unique data chunks of these backup images and uploads these data chunks to the cloud storage. The cloud-appliance can integrate with the cloud infrastructure APIs to discover any other systems running in the cloud. The cloud-appliance can be configured to regularly backup these systems (e.g. are manually created in the cloud).

It is noted, that after the system is recovered and running on the cloud, the cloud-appliance can back up the system regularly. The system can upload unique data chunks to cloud storage. In the event a user would like a server image back on the on-site premises, the following steps can be performed. At the location where the customer wants the image back, the user can power-on another on-site appliance and configure it to regularly download new unique data chunks from the cloud storage. When all the unique data chunks for an image are downloaded, the on-site appliance can restore this image.

In one example, a difference between distributed GC and local GC can be as follows. When a replicated image is expired, a distributed GC on onsite can clean up the local view of replicated file system by cleaning up remote fs database and inform the remote site about the expired image. Then the remote site cleans up the replicated image from its local file system when the local GC runs.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computer-implemented method of a dedupe file system comprising:
   replicating a dedupe file system specific metadata of a backup image;
   replicating one or more data chunks of a backup image;
   replicating the backup application specific metadata;
   advertising to the backup application that the backup image is read ready,
   downloading the dedupe file system specific metadata of the backup image; and
   wherein when a when a replicated image is expired:
      cleaning up a local view of a replicated file system, with an onsite-only garbage collection operation, by cleaning up a remote file system database;
      informing a remote site about an expired image; and
      cleaning up the replicated image from a local file system of the remote site while the onsite-only garbage collection operation is implemented.

2. A computer-implemented method of handling garbage data chunks in a replication operation of a dedupe file system comprising: determining when a garbage collection operation is initiated; recording the initiation time of the garbage collection
   when the garbage collection operation is in a data deletion state, for each garbage data chunk implementing the following steps:
   acquiring, with the garbage collection operation, a write lock for the data chunk;
   determining that a hardlink count of data chunk;
   if the hardlink count is one (1), marking the data chunk as garbage data chunk; and moving, with the garbage collection operation, the garbage data chunk to a temporary trash directory;
deleting, with the garbage collection operation, the dedupe file system specific metadata of backup images, which are expired;
listing, with the garbage collection operation, one or more new backup images created as a result of a replication operation after the initiation time of garbage collection operation, and wherein the listing, with the garbage collection operation, of one or more new backup images created as a result of a replication operation is implemented at the end of a data deletion state, wherein the replication operation comprises an upload operation, a download operation or a backup operation;
for each such new backup image, reclaiming, with the garbage collection operation, one or more data chunks included in a backup image that is a part of the temporary trash directory, and wherein the garbage collection operation recovers the one or more backup data chunks to the dedupe file system; and
deleting, with the garbage collection operation, all the remaining data chunks present in the temporary trash directory.

3. A computer-implemented method of handling garbage data chunks in a replication operation of a dedupe file system comprising:
determining when a garbage collection operation is initiated;
recording the initiation time of the garbage collection
when the garbage collection operation is in a data deletion state, for each garbage data chunk implementing the following steps:
acquiring, with the garbage collection operation, a write lock for the data chunk;
determining that a hardlink count of data chunk;
if the hardlink count is one (1), marking the data chunk as garbage data chunk; and
moving, with the garbage collection operation, the garbage data chunk to a temporary trash directory;
deleting, with the garbage collection operation, the dedupe file system specific metadata of backup images, which are expired;
listing, with the garbage collection operation, one or more new backup images created as a result of a replication operation after the initiation time of garbage collection operation;
for each such new backup image, reclaiming, with the garbage collection operation, one or more data chunks included in a backup image that is a part of the temporary trash directory, and wherein the garbage collection operation recovers the one or more backup data chunks to the dedupe file system; and
deleting, with the garbage collection operation, all the remaining data chunks present in the temporary trash directory.

* * * * *